United States Patent
O'Riley et al.

(10) Patent No.: US 7,343,758 B1
(45) Date of Patent: Mar. 18, 2008

(54) DRY ICE COMPACTION METHOD

(75) Inventors: Jack C. O'Riley, Mt. Zion, IL (US); James C. Wohlers, Lincoln, NE (US)

(73) Assignee: Continental Carbonic Products, Inc., Decatur, IL (US)

(*) Notice: Subject to any disclaimer, the term of this patent is extended or adjusted under 35 U.S.C. 154(b) by 388 days.

(21) Appl. No.: 11/196,569

(22) Filed: Aug. 3, 2005

Related U.S. Application Data

(60) Provisional application No. 60/600,022, filed on Aug. 9, 2004.

(51) Int. Cl.
*F25J 1/00* (2006.01)
*B01F 11/00* (2006.01)

(52) U.S. Cl. .......................... 62/602; 62/605; 366/108; 366/111

(58) Field of Classification Search .................. 62/602, 62/605; 366/111, 108
See application file for complete search history.

(56) References Cited

U.S. PATENT DOCUMENTS

| | | | |
|---|---|---|---|
| 3,325,882 A * | 6/1967 | Chiou et al. ................. 438/120 |
| 3,778,348 A * | 12/1973 | Sease et al. ................. 376/430 |
| 4,707,951 A * | 11/1987 | Gibot et al. .................. 451/99 |
| 4,772,430 A * | 9/1988 | Sauda et al. .................... 588/8 |
| 5,249,426 A * | 10/1993 | Spivak et al. ................. 62/605 |
| 5,253,895 A * | 10/1993 | Bretfeld et al. ............. 280/736 |
| 5,385,023 A * | 1/1995 | Montemayor et al. ........ 62/605 |
| 5,405,049 A * | 4/1995 | Ricciardi ........................ 222/1 |
| 5,548,960 A * | 8/1996 | Anderson et al. ............. 62/605 |
| 5,635,292 A * | 6/1997 | Jennings et al. ......... 428/312.4 |
| 5,938,034 A * | 8/1999 | Josephsen et al. .......... 206/568 |
| 2001/0001618 A1* | 5/2001 | Nylund et al. ............... 376/441 |
| 2003/0017792 A1* | 1/2003 | Rivir et al. .................... 451/94 |

\* cited by examiner

*Primary Examiner*—William C Doerrler
(74) *Attorney, Agent, or Firm*—Philip L. Bateman

(57) ABSTRACT

Dry ice pellets in a container are compacted by beginning the filling of a container with dry ice pellets, vibrating the container for a short duration when the container is partially filled, and continuing vibrating the container for short durations at periodic intervals until the container is filled.

9 Claims, 2 Drawing Sheets

EFFECT OF AMOUNT OF VIBRATION ON VOLUME OF PELLETS AND FUSING

A PREFERRED VIBRATION PATTERN

DRY ICE COMPACTION METHOD

CROSS-REFERENCE TO RELATED APPLICATION

This application claims the benefit of U.S. Provisional Application Ser. No. 60/600,022, filed Aug. 9, 2004.

FIELD OF THE INVENTION

This invention relates to dry ice manufacturing and packaging. More particularly, this invention relates to a method of compacting dry ice pellets in a shipping container.

BACKGROUND OF THE INVENTION

Carbon dioxide ($CO_2$) is a compound present as a gas in the Earth's atmosphere. It is exhaled by animals and used by plants in photosynthesis. Depending on temperature and pressure, carbon dioxide exists in one of the three phases—gas, liquid, and solid. At atmospheric pressure, carbon dioxide sublimates (changes directly from the solid phase to the gas phase) at a temperature of −109° F. (−79° C.). The energy required for this phase change is more than double the energy required to change an equal mass of water from solid to liquid at atmospheric pressure. Carbon dioxide is produced in large quantities by a variety of industrial processes, including fermentation of carbohydrates and ammonia production.

Because of its abundance, safety, and thermodynamic properties, solid (frozen) carbon dioxide is widely used as an expendable refrigerant. Solid carbon dioxide is commonly referred to as "dry ice" because it sublimates without the formation of a liquid. Dry ice is generally manufactured by first cooling and pressurizing (to about 20 Atmospheres) gaseous carbon dioxide to change the phase to liquid. The liquid is then released through an expansion valve into a cooled chamber at atmospheric pressure. The expansion further cools the carbon dioxide. About half the liquid freezes to form what is known as dry ice snow and the other half changes to gas. The gas is then recycled or released to the atmosphere. The dry ice snow is compressed in block presses to form blocks or extruded to form pellets.

Dry ice pellets are extruded in three standard diameters: one-eighth inch, one-fourth inch, and one-half inch. The pellets typically drop from the extruder directly into large insulated containers. When full, the containers are covered and shipped. A typical container has a volume of about 27 cubic feet and can hold about 1300 pounds of dry ice pellets. Although the containers are insulated, some heat transfer from the surroundings to the dry ice pellets occurs. As a result, some of the dry ice sublimates during shipping and storage. The loss of dry ice from sublimation from manufacturing to use is commonly known as the "shrink." Purchasers of dry ice pellets typically pay the manufacturer based on the weight of delivered dry ice.

It would be highly desirable to increase the weight of dry ice pellets in a container. Any such increase would result in a direct reduction in shipping costs. It would also be highly desirable to reduce the amount of sublimation that occurs during shipping and storage, i.e., between manufacture and use. Accordingly, a demand exists for a method of packaging dry ice pellets in a shipping container that increases the quantity of pellets that fit in the container and that reduces the rate of sublimation.

SUMMARY OF THE INVENTION

The general object of this invention is to provide an improved method of compacting dry ice pellets in a shipping container.

We have invented a method of compacting dry ice pellets in a shipping container. The method comprises: (a) beginning the filling of a container with dry ice pellets; (b) vibrating the container for a short duration when the container is partially filled; and (c) continuing vibrating the container for short durations at periodic intervals until the container is filled.

The method of this invention enables about 15 to 20 percent more dry ice pellets to be loaded into a shipping container. This reduces shipping costs and also reduces the quantity of dry ice that sublimates during shipping and storage.

DETAILED DESCRIPTION OF THE INVENTION

Figure 1:
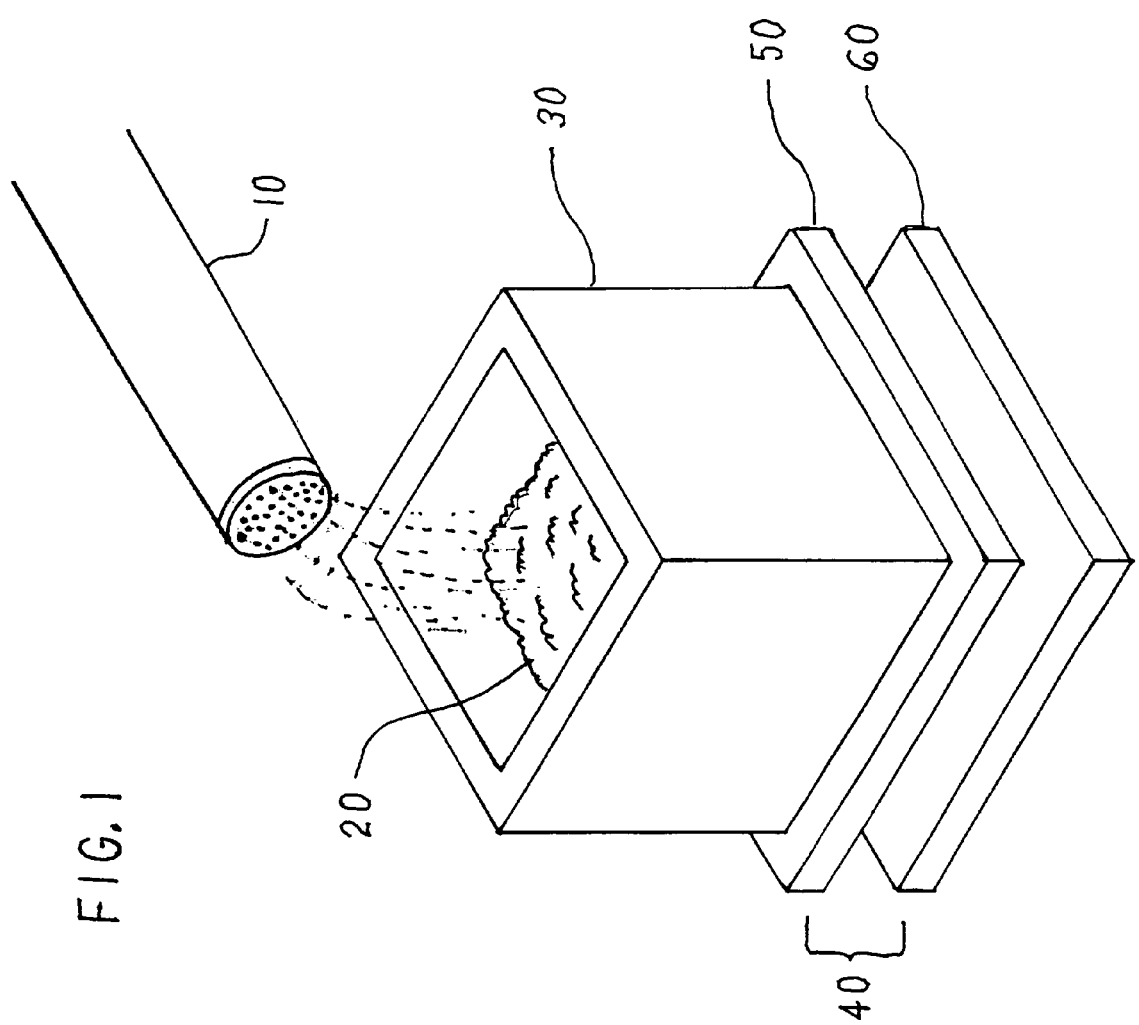
FIG. 1 is a perspective view of equipment used in practicing the method of this invention.

This invention is best understood by reference to the drawings. FIG. 1 illustrates typical equipment used to practice the method of this invention. A conventional extruder 10 is shown producing dry ice pellets 20. The pellets drop from the extruder die directly into a conventional insulated container 30. The container sits upon a vibration system 40 having a vibrating table 50 and a stationary base 60. The vibration system includes motors and controls (not shown) that enable the table to vibrate relative to the stationary base. Vibration systems are conventional and are available from several different manufacturers. A preferred vibration system is a vibration table manufactured by Deca Products, Inc. of Bridgeview, Ill. The Deca vibration system contains two counterweighted motors that rotate in opposite directions to produce a linear motion along a vertical axis in line with the extruder discharge and the insulated container.

The filling of the container begins with the placement of an empty container on the table under the discharge end of the extruder. As pellets are produced, they drop directly down into the container. When the container is partially filled, the vibration system is turned on and the container is vibrated for a short period of time. The vibration causes the pellets to compact. In other words, the pellets are rearranged so they occupy less volume and are in closer proximity to each other. After the short period of vibration, the vibration system is turned off. After waiting another a period of time, the vibration system is again turned on for a short period of time. This pattern continues until the container is full.

Vibrating tables are used in industry to compact a variety of bulk materials. When vibrating bulk materials, increasing the duration and/or the intensity of the vibrations causes no change or harm to the materials themselves. Accordingly, the vibrating tables are typically run continuously. The only reason the table is not run continuously is to save energy costs and/or to reduce wear on the table. However, it has been surprisingly discovered that dry ice is different from all other bulk materials. Vibrating a material creates friction which, in turn, causes heat. It has been discovered that excessive vibration causes so much heat that an excessive quantity of the dry ice sublimates. Excessive sublimation can, in turn, cause the dry ice pellets to fuse together. Accordingly, the amount of vibration applied to dry ice must be carefully controlled.

Figure 2:
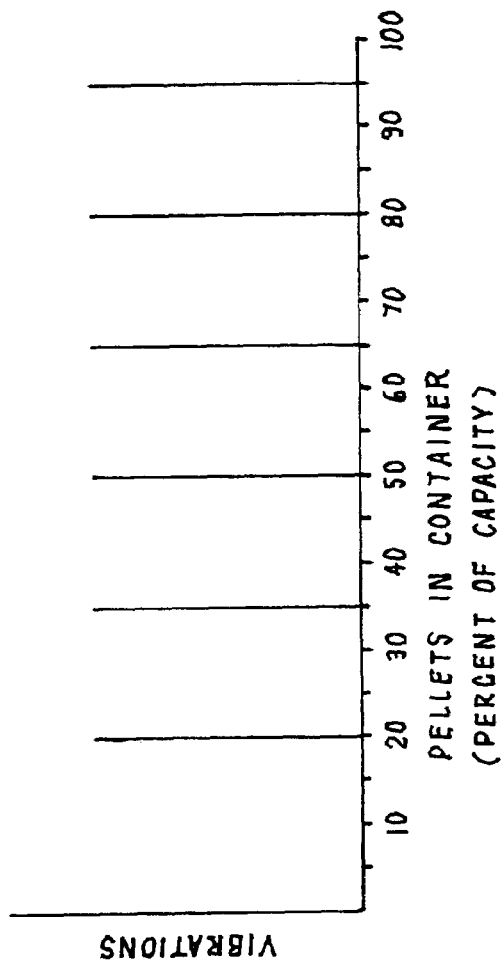
FIG. 2 is a chart showing the effect of vibration on pellet volume and fusing.

FIG. 2 illustrates that the optimal amount of vibration for dry ice is determined by two opposing factors. As the amount of vibration increases, the volume of the dry ice is reduced until a minimum is reached. At the same time, the amount of fusing increases steadily. Thus, it is seen that increasing the amount of vibration is beneficial only up to the point where the two curves intersect. Increasing the amount of vibration beyond this point has little or no effect on volume reduction yet increases the amount of fusing. The amount of vibration that corresponds to this intersection of curves varies from situation to situation depending on many factors, including the size of the pellets, the size of the container, the intensity of the vibration, etc. It is a routine experimental matter to determine the optimal amount of vibration in a particular situation.

Figure 3:
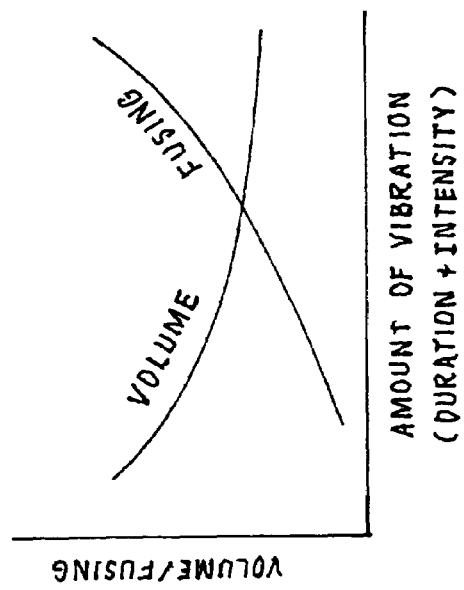
FIG. 3 is a chart showing a suitable vibration pattern.

FIG. 3 illustrates a preferred pattern of vibrations for a Deca Products vibration table during the filling of a conventional 27-cubic-foot dry ice container at the rate of about 15 to 20 pounds of pellets per minute. The x-axis indicates the quantity of pellets in the container expressed as a percentage of capacity. The y-axis indicates whether the vibration system is on or off. The pattern in FIG. 3 shows short vibrations occurring when the container is 20% full, 35% full, 50% full, 65% full, 80% full, and 95% full. Each of the six vibrations is relatively short in length. The vibration time is generally less than a minute, preferably less than 30 seconds, and most preferably about 10 seconds in length. Controlling the vibration system based on quantity of pellets in the container requires a means for measuring the quantity such as a load cell. Another basis for control is time. For example, if it typically takes 100 minutes to fill a container, a similar vibration pattern is achieved by waiting 20 minutes after filling is begun, beginning the vibration, continuing the vibration for 10 seconds, turning off the vibration, waiting an additional 15 minutes before beginning the vibration again, and so on.

A vibration pattern similar to that shown in FIG. 3 typically achieves an increase of about 15% in the quantity of dry ice pellets in a container with very little or no increase in fusing. For example, a particular container filled without vibration holds about 1300 pounds of pellets whereas the same container filled with vibration holds slightly more than about 1500 pounds of pellets. While not wishing to be bound by theory, it is believed that a 20% increase in quantity may be achievable in certain situations. The optimal vibration pattern is believed to depend upon several factors, including the size of pellets, the size of container, and the intensity of vibrations.

The method of this invention increases the quantity of dry ice pellets in a container and this results in a corresponding decrease in shipping costs. For example, the cost to ship a container filled with 1300 pounds of pellets is the same as the cost to ship a container filled with 1500 pounds of pellets. Therefore, the shipping cost per quantity of dry ice is reduced. Moreover, it has been surprisingly discovered that the method of this invention also reduces the rate at which the dry ice pellets sublimate during shipping and storage. The reduction in the rate of sublimation is a benefit to both manufacturers and users of dry ice.

The following example is illustrative only.

EXAMPLE 1

This example illustrates the increase in capacity and the reduction in the rate of sublimation that occurs when the method of this invention is practiced. Two identical, conventional 27-cubic-foot containers are filled with dry ice pellets. The first container is not vibrated during filling while the second container is vibrated in accordance with this invention. After filling, the two containers are weighed. The first container contains 1300 pounds of dry ice pellets and the second container contains 1500 pounds of dry ice pellets. After weighing, the two containers are loaded onto a truck and shipped. Upon reaching their destination about twenty-four hours after manufacture, the containers are again weighed. It is discovered that the percentage of dry ice pellets that sublimates from the 1300 pound container is greater than the percentage that sublimates from the 1500 pound container.

We claim:

1. A method of compacting dry ice pellets in a container, the method comprising:
   (a) beginning the filling of a container with dry ice pellets;
   (b) vibrating the container for a short duration when the container is partially filled before any substantial fusing of the dry ice pellets occurs; and
   (c) continuing vibrating the container for short durations at periodic intervals until the container is filled to produce densely compacted dry ice pellets without any substantial fusing and to reduce the rate of sublimation during shipping and storage.

2. The method of claim 1 wherein the container is first vibrated when it is less than about half filled.

3. The method of claim 2 wherein the duration of vibration is less than about one minute and the intervals between vibration are greater than about five minutes.

4. The method of claim 3 wherein the container is vibrated on a vibration table.

5. A method of compacting dry ice pellets in a container, the method comprising:
   (a) beginning the filling of a container with dry ice pellets;
   (b) vibrating the container when the container is partially filled for a duration and intensity such that substantially no fusing of the dry ice pellets occurs; and
   (c) continuing vibrating the container as filling continues at periodic intervals for a duration and intensity such that substantially no fusing of the dry ice pellets occurs.

6. The method of claim 5 wherein the container is first vibrated when it is less than about half filled.

7. The method of claim 6 wherein the duration of vibration is less than about one minute and the intervals between vibration are greater than about five minutes.

8. The method of claim 7 wherein the container is vibrated on a vibration table.

9. The method of claim 8 wherein the container is vibrated for about ten seconds when the container is 20% full, 35% full, 50% full, 65% full, 80% full, and 95% full.

* * * * *